E. T. WILLIAMS.
ICE MAKING AND HARVESTING APPARATUS.
APPLICATION FILED NOV. 25, 1910.
1,051,300.
Patented Jan. 21, 1913.
2 SHEETS—SHEET 2.
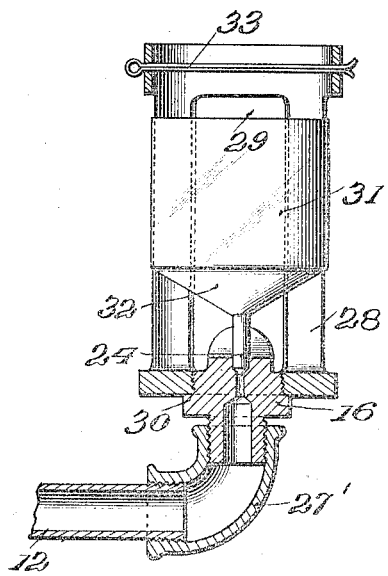
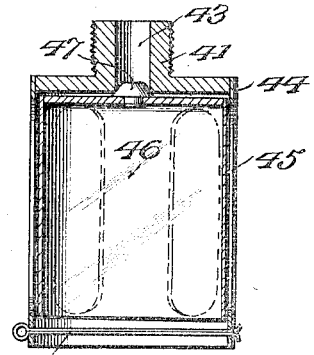
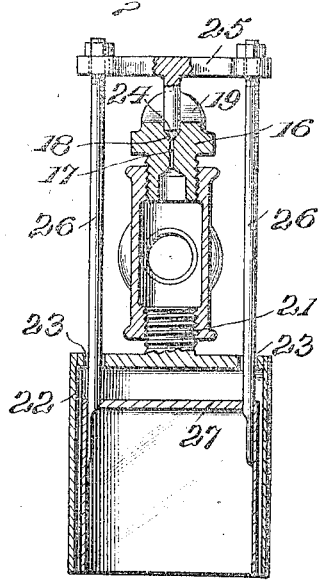
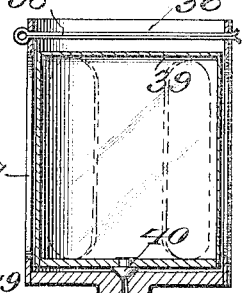
Witnesses
W. A. Williams
H. L. Mitrie
Inventor
Edward T. Williams
By Robertson & Johnsen
Attorneys

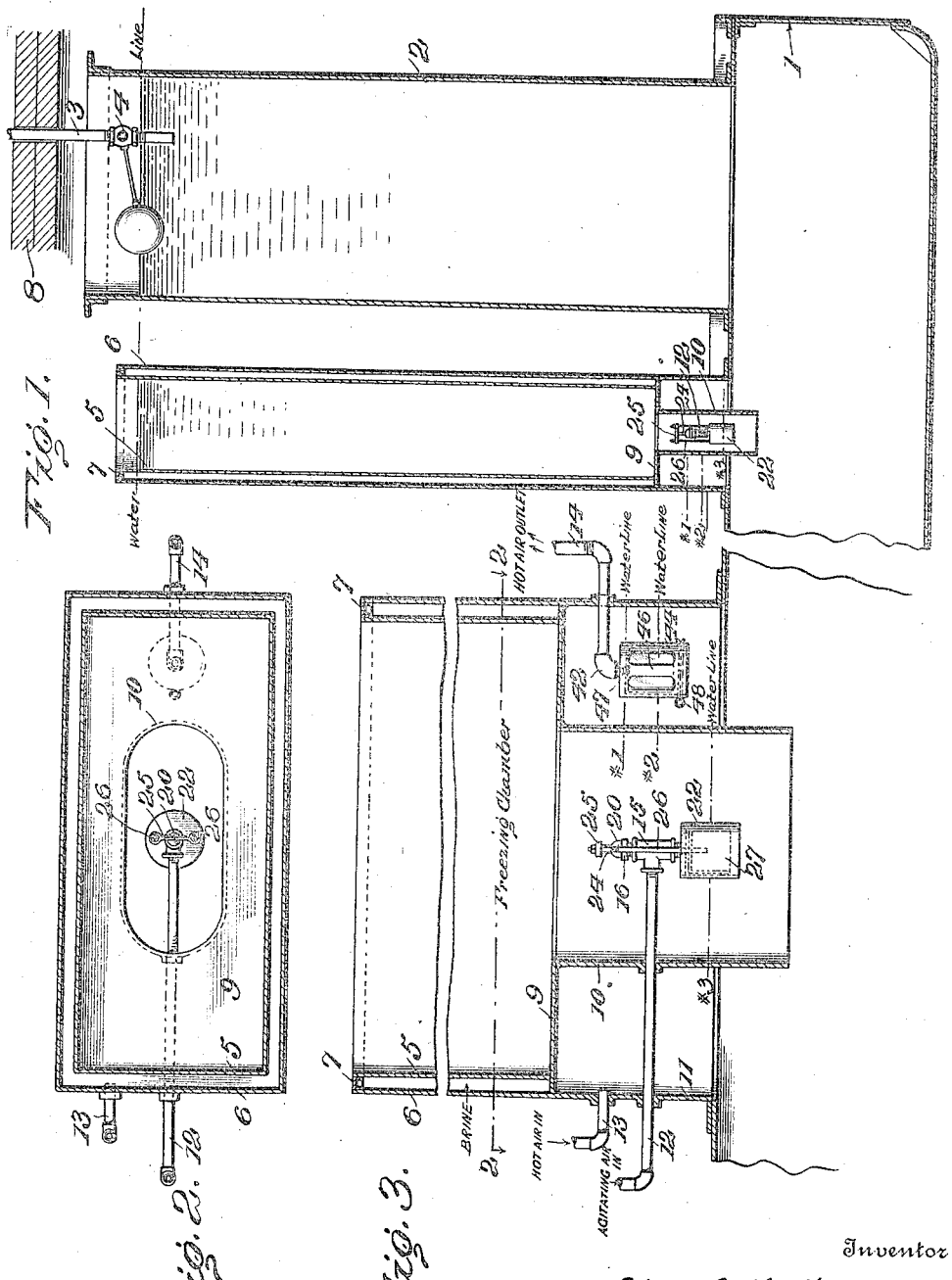
E. T. WILLIAMS.
ICE MAKING AND HARVESTING APPARATUS.
APPLICATION FILED NOV. 25, 1910.
1,051,300.
Patented Jan. 21, 1913.
2 SHEETS—SHEET 1.

UNITED STATES PATENT OFFICE.

EDWARD T. WILLIAMS, OF BROOKLYN, NEW YORK.

ICE MAKING AND HARVESTING APPARATUS.

1,051,300.

Specification of Letters Patent. Patented Jan. 21, 1913.

Application filed November 25, 1910. Serial No. 594,056.

*To all whom it may concern:*

Be it known that I, EDWARD T. WILLIAMS, a citizen of the United States, and a resident of Brooklyn, in the county of Kings and State of New York, have invented certain new and useful Improvements in Ice Making and Harvesting Apparatus, of which the following is a specification.

My invention relates to improvements in ice making and harvesting apparatus and has to do more particularly with the molds, the means for introducing and automatically controlling the delivery of agitating air thereto, the arrangement and control of the auxiliary thawing devices, and other matters hereinafter pointed out.

While my invention is along the general line of my copending applications S. Nos. 554,943 filed April 12, 1910, 566,660, filed June 13, 1910 and 569,968, filed July 1, 1910, and while it is, indeed, yet more widely applicable, it may be best explained by reference to my copending application S. No. 590,518 filed November 3, 1910. In that application I illustrated different embodiments of means for enabling the freezing ice cake to diminish automatically the supply of agitating air, several air delivery openings located in the path of the freezing ice cake being provided. I also illustrated therein closed auxiliary thawing chambers constituting double bottoms for the molds. I find in practice, however, that a single small air delivery opening is sufficient to give the proper agitation at all stages of the freezing operation, and that the closed auxiliary thawing chambers may be dispensed with, the construction to be described being cheaper and better. Automatic means for shutting off the agitating air supply on the completion of the ice cake is desirable and, in the illustrated embodiments of my invention, I have provided a normally open float valve at the bottom of each mold below the normal freezing zone governing the air supply and shutting it off on the completion of the ice cake. Omitting the double bottom constituting the auxiliary thawing chamber, I introduce hot air to the open bottomed chambers under the molds and provide a normally closed float valve in the said chamber governing the outlet therefrom and opening it when the hot air is turned on. This brief comparison is merely suggestive.

Other features and advantages of my invention will be pointed out hereafter in the more detailed description.

My invention therefore consists in the subject matter, embodiments of which are illustrated and described herein, and in the matter set forth in the appended claims.

Referring to the drawings: Figure 1 is a transverse vertical section through the tank, reservoir and one of the molds. Fig. 2 is a horizontal section and plan on the line 2—2, Fig. 3. Fig. 3 is a vertical longitudinal section of one of the molds. Fig. 4 is a vertical section of one form of air delivery float valve. Fig. 5 is a vertical section of an outlet float valve. Fig. 6 is a vertical section of another form of air delivery float valve. Fig. 7 is a vertical section, and Fig. 8 an elevation at right angles thereto of the preferred form of air delivery float valve.

While, as stated, my invention is not limited thereto, I have illustrated it as applied to the system shown in my copending applications above referred to, S. Nos. 569,968 filed July 1, 1910, and 590,518, filed November 3, 1910.

Referring to Figs. 1, 2 and 3: 1 is a shallow water tank provided with a stand pipe or reservoir 2 fed by a supply pipe 3, controlled by a float valve 4. On the top of the tank are molds having inner walls 5 and outer walls 6 forming between them a jacket for freezing and thawing fluid as illustrated in all my other applications above referred to. These molds are secured to the top of the tank by water tight connections and are provided with bottoms having holes by which they are in communication with the water in the tank and are automatically filled to the level of the water in the stand pipe. As in the system set forth in said copending applications just mentioned, the bottoms of the molds are above the top of the tank, when employed in a system of this character, so as to leave working space between the said bottoms and tank top for connections, etc. and to permit the headers to be located above the top of the tank. I prefer to butt-weld all joints and seams of the molds and to employ a metal top frame 7 having depending flanges welded to the mold walls. This construction is very strong and the method is inexpensive. 8 designates a part of an insulating cabinet which is ordinarily used around the tank and molds.

Systems for circulating fluids, as brine, in ice making apparatus including piping, a pump, etc., are well known in the art, and complete systems for circulating freezing fluid and for circulating thawing fluid, including apparatus for heating the one and for cooling the other, are illustrated and described in my aforesaid co-pending application, Ser. No. 554,943, and nothing would be gained by duplicating such illustration and description in this application.

For serving the molds with freezing and thawing fluid, and with agitating air any suitable arrangements of piping may be used, preferably such as are described in my said applications. Any suitable means for freezing the water in the molds may be employed. I prefer, however, freezing and thawing means individual to each mold and controlling means substantially as shown in my said application S. No. 590,518.

It will be apparent that I have gone back to the type of mold bottom illustrated in my earlier applications in which the molds are so constructed as to provide auxiliary thawing and air insulating chambers directly beneath the mold bottom, these chambers being open at the bottom to the tank. The bottoms 9, as so constructed, are single and have a hole surrounded by a depending shell 10, which in turn is inclosed by a wall 11 depending from the mold bottom preferably the extended outer mold wall. The shell should for the best results extend below the bottom of this wall, and in the system shown below the top of the tank. Instead of introducing agitating air and thawing air by turns into the said chambers, I conduct the agitating air by the pipe 12 through said chamber to the space within the shell 10 where it is delivered to the water in the mold. The open ended chamber I reserve for hot air which enters by the inlet pipe 13 and leaves by the outlet pipe 14.

While I prefer to use molds having bottoms of the type described, I may employ molds entirely open at the bottom without interference with the delivery of agitating air to the water therein and the automatic control of the air delivering means. It is better, however, to provide the molds with bottoms as above described. These are best arranged with a single central hole, the agitating air delivering means being for the most even distribution of the air placed in the vertical axis of the mold. This means may of course be varied and may deliver air at a plurality of points, but I prefer a single small opening axially located. A diameter of 1/64" serves admirably the air being supplied under the usual pressure. A normally open float valve of the type which is open when submerged is located in the water at the bottom of the mold below the normal freezing zone.

In Figs. 4, 6, 7 and 8 three forms of this valve are shown. Others may be used. The preferred form, best shown in Figs. 7 and 8, will be described first. A T coupling 15 having its cross piece vertical is screwed to the end of the agitating air delivery pipe 12. Into the open top of the cross piece of the T coupling is screwed the plug 16 having the delivery opening 17, the valve seat 18, and the transverse slot 19 through its hemispherical end 20. This secures the best distribution of the air of any nozzle I have yet tried. Into the open bottom of the T coupling is screwed a plug 21 carrying the casing 22 which is an open bottomed chamber having holes 23 in its top. The valve plug or valve proper 24, working in a bore of corresponding size and shape located centrally in the top of the plug 16, is carried by a cross piece 25 above the slot 19 and illustrated as parallel to it so as to interfere as little as possible with the proper delivery of the air. From this cross piece depend rods 26 suitably secured thereto, extending through the holes 23 and having their lower ends fastened to a float 27 similar in form to the casing 22 and guided by it for vertical movement. This arrangement gets the float out of the way of the air.

Another form, illustrated in Fig. 4, has a plug 16, substantially as already described, screwed into the elbow 27' and carrying the guide cage 28 having opening 29 and screwed onto the plug 16 against the shoulder 30. Within this vertical cage works the closed float 31, which has a conical bottom 32 and carries the valve proper or valve plug 24 working as above described. A cotter pin 33 acts as a stop for the float.

The valve shown in Fig. 6 is very simple consisting of a screw threaded plug 34 containing the air delivery opening 35 and carrying the vertical guide cage 36, having holes 37 and a cotter pin stop 38. Within the cage works the closed float 39 carrying the valve plug on valve proper 40.

The operation of all these valves is in general the same. They are all submerged in the water filling the molds at the beginning of the freeze and, when submerged, hold the air delivery means open. This relation continues until the freezing ice cake closes the hole in its middle thus preventing the escape of the air up through the mold, and creating air pressure below the completed ice cake. This drives down the water level in the casing until, as at water line #3, the weight of the movable parts of the valve is greater than the buoyant effect of the water and the valve closes. As soon, however, as the removal of the ice cake relieves this pressure the float valve automatically rises to open position and the delivery of agitating air automatically recommences. The supply of agitating air to a mold is thus automatically shut off on the completion of the ice cake in that mold, and automatically restored on the removal of the ice cake therefrom. This is especially useful where there are many molds. The automatic individual action saves trouble and expense.

Referring now to the thawing air control: I avoid the necessity of using galvanized iron and tinning all rivets and exposed surfaces to prevent rust, by omitting the false bottom and using instead an open bottomed chamber. This enables me to make the molds out of black iron sheets and to galvanize them after completion. The employment of the outlet valve to be shortly described enables me to omit the double bottom without losing any of the advantages secured by it. This also prevents any of the agitating or thawing air from passing to the tank below, and at the same time maintains an air insulating pocket between the can bottom and the surface of the water in the space around the depending shell. Any water of condensation falls directly into the water below the bottom.

Referring to Figs. 1, 2, 3 and 5: Each mold has a hot air inlet pipe 13 and a hot air outlet pipe 14 leading respectively to and from the open bottomed chamber under the mold. This relation of the inlet and outlet is such that, even if the outlet valve leaks, an insulating air space will always be maintained under the bottom, save during thawing. The outlet opening is larger than the agitating air delivery opening, and the float valve works oppositely to that governing the delivery opening, i. e. it is of the type which is closed when immersed and is normally held closed, opening only when the water line is depressed. This valve may be of the form illustrated in Fig. 5 having a screw threaded plug 41 for insertion into the elbow 42 and containing the outlet 43. The vertical guide casing 44, having holes 45, is carried by this plug. In it works the open bottomed float 46, carrying the valve plug or valve proper 47. A cotter pin stop 48 is carried by the casing.

The operation is as follows: Normally the water in the inverted chamber beneath the mold stands at water line #1 floating the valve into closed position. When, however, the hot air is turned on in harvesting, the increased air pressure drives the water in said chamber down to water line #2, at which the weight of the valve is greater than the buoyancy of the float and the valve drops opening the outlet, closing again, however, when the hot air is turned off and the extra pressure is relieved by the passage of air through the outlet. If any agitating air should be forced out from below the can bottom it would escape through this outlet.

It will be understood that hand valves may be used for controlling the air delivery supply pipe in addition to the automatic means provided. The air delivery nozzles in the preferred form illustrated in Figs. 4, 7 and 8 are similar to the well known fish tail gas burners and I have referred to them in the claims as fish tail delivery nozzles.

What I claim is:

1. Ice making apparatus comprising in combination, a water tank, a plurality of molds in communication at the bottom with the tank, means for freezing the water in the molds, means for introducing agitating air into the water in the molds, and devices controlling the said means for introducing agitating air and operating automatically on the completion of the ice cake to shut off the supply of agitating air.

2. Ice making apparatus comprising in combination a water tank, a plurality of molds in communication at the bottom with the tank, means for freezing the water in the molds, means for introducing agitating air into the water in each mold at its bottom, and a float valve at the bottom of each mold below the freezing zone controlling the said means for introducing agitating air into that mold.

3. Ice making apparatus comprising in combination a water tank, a plurality of upright molds in communication at the bottom with the tank, individual freezing and thawing means for each mold, means for introducing agitating air into the water in each mold at its bottom, and a normally open float valve at the bottom of each mold below the freezing zone controlling the said means for introducing agitating air into that mold, and operating automatically on the completion of the ice cake to shut off the supply of air.

4. Ice making apparatus comprising in combination a water tank, a plurality of upright molds each having a bottom provided with a hole whereby it is in communication with said tank, means for freezing the water in the molds, a shell surrounding said hole and depending from the bottom of the mold, means for introducing agitating air into the water in each mold at its bottom, and devices individual to each mold located within the shell, controlling said means for introducing agitating air and operating automatically on the completion of the ice cake in a mold to shut off the supply of air to that mold.

5. Ice making apparatus comprising in combination, a water tank, a plurality of upright molds having bottoms provided with holes whereby they are in communication with said tank, freezing and thawing means for the molds, shells surrounding said holes and depending from the bottoms of the molds an inclosing wall depending from the bottom of each mold thus forming an open bottomed chamber beneath the mold, means for introducing agitating air to the water in each mold, and a float valve individual to each mold located within the shell, controlling said means for introducing agitating air and operating automatically on the completion of the ice cake in a mold to shut off the supply of air to that mold.

6. Ice making apparatus comprising in combination, a water tank, a plurality of upright molds having bottoms provided with holes whereby they are in communication with said tank, means for freezing the water in the molds, an inclosing wall depending from the bottom of each mold, shells surrounding said holes, depending from the bottoms of the molds and extending below the bottom of the inclosing wall thus forming an open bottomed chamber beneath the mold, means for introducing agitating air to the water in each mold at its bottom, and float valves individual to each mold located within the shells, controlling the said means for introducing agitating air and operating automatically on the completion of the ice cake in a mold to shut off the supply of air to that mold.

7. Ice making apparatus comprising in combination, a water tank, a reservoir in communication therewith, a plurality of upright molds on top of said tank having a water tight connection therewith and having bottoms above the top of the tank provided with holes whereby they are in communication with said tank, freezing and thawing means for the molds, shells depending from said bottoms and surrounding said holes, means for introducing agitating air to the water in each mold, and devices controlling said means for introducing agitating air to the water in the molds and operating on the completion of the ice cake in a mold to shut off the supply of air to that mold.

8. Ice making apparatus comprising in combination, a water tank, a reservoir in communication therewith, a plurality of upright molds on top of said tank having a water tight connection therewith and having bottoms above the top of the tank provided with holes whereby they are in communication with said tank, means for freezing the water in the molds, shells depending from said bottoms surrounding said holes and extending below the top of the tank, inclosing walls depending from the bottoms of said molds, means for introducing agitating air to the water in each mold, and a float valve at the bottom of each mold below the freezing zone controlling the said means for introducing agitating air into that mold.

9. In ice making apparatus, a mold, means for freezing the water therein, a pipe for introducing air into the water in the mold at its bottom, a normally open float valve below the normal freezing zone governing the outlet of said pipe to close it automatically on the completion of the ice cake.

10. Ice making apparatus comprising in combination, a water tank, a plurality of upright molds in communication at the bottom with said tank, means for delivering agitating air to individual molds at their bottoms, said means having fish tail delivery nozzles, and a float valve controlling each nozzle.

11. In ice making apparatus, an agitating air delivery device having a fish tail delivery nozzle and a float valve controlling the passage of air to the same.

12. In ice making apparatus, a mold having at its bottom an agitating air supply pipe having a fish tail delivery nozzle and an inlet thereto, a casing supported by said pipe, a float working in said casing, and a valve plug connected to said float and controlling said inlet.

13. In ice making apparatus, a mold having an agitating air pipe provided with an air delivery nozzle at the bottom of the mold, a valve controlling said nozzle and provided with an operating float below the nozzle.

14. In ice making apparatus, a mold having an agitating air pipe provided with an air delivery nozzle at the bottom of the mold, a cross piece, a valve plug carried thereby and controlling the inlet to said nozzle, a float below the nozzle suspended from the cross piece, and means for guiding the float valve.

15. Ice making apparatus comprising in combination, a water tank, a plurality of upright molds in communication therewith at the bottom, freezing and thawing means for the molds, each mold having at its bottom below the normal freezing zone a thawing fluid inlet and a thawing fluid outlet, and devices at the bottom of the mold for automatically controlling said outlet.

16. Ice making apparatus comprising in combination, a water tank, a plurality of upright molds, freezing and thawing means for the molds said molds having bottoms provided with holes, depending shells surrounding said holes, inclosing walls depending from the bottoms of the molds and forming with the shells open bottomed chambers, means for introducing hot air to these chambers, an air outlet therefrom, and a float valve in said chamber governing said outlet.

17. Ice making apparatus comprising in combination, a water tank, a reservoir in communication therewith, a plurality of upright molds on top of said tank having a water tight connection therewith and having bottoms above the top of the tank provided with holes whereby they are in communication with said tank, freezing and thawing means for the molds, shells depending from said bottoms and surrounding said holes, inclosing walls depending from the bottoms of the molds thus forming open bottomed chambers above the top of the tank, a hot air inlet to said chamber, an air outlet therefrom, and a float valve in said chamber governing said outlet.

18. Ice making apparatus comprising in combination, a water tank, a plurality of upright molds in communication therewith and having bottoms provided with holes surrounded by depending shells, said bottoms having also inclosing walls forming open bottomed air chambers, freezing and thawing means for said molds, means for delivering hot air to said open bottomed chambers, an air outlet from each of said chambers, a float valve at the bottom of each mold below the normal freezing zone controlling said outlet, means for introducing agitating air to the water in the molds at their bottoms, and a float valve within the depending shell for controlling said means for introducing agitating air.

Signed by me at New York this 23d day of November, 1910.

EDWARD T. WILLIAMS.

Witnesses:
H. T. BERNHARD,
JENNIE DUPREE.